United States Patent
Tokutaka et al.

(10) Patent No.: US 10,422,956 B2
(45) Date of Patent: Sep. 24, 2019

(54) OPTICAL MODULATION DEVICE

(71) Applicant: Sumitomo Osaka Cement Co., Ltd, Chiyoda-ku, Tokyo (JP)

(72) Inventors: Hara Tokutaka, Chiyoda-Ku (JP); Ryo Shimizu, Chiyoda-Ku (JP)

(73) Assignee: SUMITOMO OSAKA CEMENT CO., LTD., Tokyo (JP)

( * ) Notice: Subject to any disclaimer, the term of this patent is extended or adjusted under 35 U.S.C. 154(b) by 0 days.

(21) Appl. No.: 16/090,367

(22) PCT Filed: Mar. 24, 2017

(86) PCT No.: PCT/JP2017/011940
§ 371 (c)(1),
(2) Date: Oct. 1, 2018

(87) PCT Pub. No.: WO2017/170195
PCT Pub. Date: Oct. 5, 2017

(65) Prior Publication Data
US 2019/0113684 A1    Apr. 18, 2019

(30) Foreign Application Priority Data
Mar. 31, 2016 (JP) .................................. 2016-070476

(51) Int. Cl.
*G02B 6/27* (2006.01)
*G02B 6/30* (2006.01)
(Continued)

(52) U.S. Cl.
CPC ............... *G02B 6/272* (2013.01); *G02B 6/30* (2013.01); *G02B 6/32* (2013.01); *G02B 6/34* (2013.01); *G02F 1/035* (2013.01)

(58) Field of Classification Search
CPC . G02B 6/272; G02B 6/30; G02B 6/32; G02B 6/34; G02F 1/035
See application file for complete search history.

(56) References Cited

U.S. PATENT DOCUMENTS

2002/0041574 A1    4/2002 Du et al.
2011/0255147 A1*  10/2011 Oguri ..................... G02B 6/126
                                                            359/303
(Continued)

FOREIGN PATENT DOCUMENTS

JP    2010156842 A    7/2010
JP    2012203282 A    10/2012
(Continued)

OTHER PUBLICATIONS

Translation of the International Search Report for PCT/JP2017/011940 dated Jun. 27, 2017.

*Primary Examiner* — Peter Radkowski
(74) *Attorney, Agent, or Firm* — Greer, Burns & Crain, Ltd.

(57) ABSTRACT

There is provided an integration-type optical modulation device which performs polarization-beam-combining on two linearly polarized light beams respectively output from a plurality of optical modulation elements and outputs the resultant beam so as to seek an improvement and stabilization of optical characteristics, miniaturization, and low cost. The optical modulation device includes: first and second optical modulation elements 102a and 120b that are disposed to output output light beams side by side and respectively output the two output light beams; first and second optical path shift elements 108a and 108b that respectively shift optical paths of the two output light beams from the first optical modulation element and optical paths of the two output light beams from the second optical modulation element in first and second directions; and first and second polarization beam combining elements 110a and 110b that respectively combine the two output light beams after passing through the first and second optical path shift elements into one beam and outputs the one beam, in which the first (Continued)

optical path shift element and the second optical path shift element are integrally formed as one optical component.

10 Claims, 2 Drawing Sheets

(51) Int. Cl.
*G02B 6/32* (2006.01)
*G02B 6/34* (2006.01)
*G02F 1/035* (2006.01)

(56) References Cited

U.S. PATENT DOCUMENTS

| 2012/0237156 | A1* | 9/2012 | Rohde | H04B 10/5053 |
| | | | | 385/3 |
| 2015/0253521 | A1* | 9/2015 | Maruyama | G02B 6/4244 |
| | | | | 385/11 |
| 2015/0261017 | A1* | 9/2015 | Doi | H04B 10/501 |
| | | | | 398/201 |
| 2016/0011377 | A1 | 1/2016 | Okamura et al. | |

FOREIGN PATENT DOCUMENTS

| JP | 2014163993 A | 9/2014 |
| JP | 2015169795 A | 9/2015 |
| JP | 2015172630 A | 10/2015 |
| WO | WO2014051096 A1 | 4/2014 |

* cited by examiner

OPTICAL MODULATION DEVICE

TECHNICAL FIELD

Certain embodiments of the present invention relate to an optical modulation device that modulates light beams input from one optical fiber by an optical modulation element and outputs the resultant modulated light beams from another optical fiber, and particularly to, an integration-type optical modulation device that includes a plurality of optical modulation elements which are formed on separate substrates, or are formed on one substrate side by side, and performs polarization beam combining of two linearly polarized light beams, which are modulated and are output from the plurality of optical modulation elements and outputs the resultant light beam.

BACKGROUND ART

In a high-frequency and large-capacity optical fiber communication system, optical modulators including a waveguide-type optical modulation element have been widely used. With regard to the optical modulators, an optical modulation element, in which $LiNbO_3$ (hereinafter, also referred to as "LN") having an electro-optic effect is used for a substrate, is widely used in a high-frequency and large-capacity optical fiber communication system when considering that it is possible to realize wide-band optical modulation characteristics with a low optical loss.

In the optical modulation element using the LN, for example, a Mach-Zehnder type optical waveguide is formed on the LN substrate, and when a high-frequency signal is applied to an electrode formed on the optical waveguide, a modulated signal light beam (hereinafter, referred to as "modulated light beam") corresponding to the high-frequency signal is output. In addition, in a case of using the optical modulation element in an optical transmission device, an optical modulation device, which includes a housing in which the optical modulation element is accommodated, an input optical fiber through which a light beam from a light source is input to the optical modulation element, and an output optical fiber that guides the light beam output from the optical modulation element to the outside of the housing, is used.

With regard to a modulation mode in the optical fiber communication system, a transmission format in which polarization multiplexing is introduced becomes a mainstream from the recent trend of an increase in transmission capacity. Examples of the transmission formation include dual polarization-quadrature phase shift keying (DP-QPSK), dual polarization-quadrature amplitude modulation (DP-QAM), and the like in which two linearly polarized light beams in polarization directions orthogonal to each other are subjected to phase shift keying or quadrature amplitude modulation and are transmitted by one optical fiber.

In the optical modulation device that performs the DP-QPSK modulation or the DP-QAM modulation, a linearly polarized light beam output from one light source is input to the optical modulation element. In the optical modulation element, the input linearly polarized light beam is branched into two light beams, and the two light beams are modulated by using two independent high-frequency signals. The two linearly polarized modulation light beams, which are modulated, are combined into one light beam and the resultant light beam is output in a state of being coupled to one optical fiber.

On the other hand, for example, consideration is given to the following wavelength multiplexing system so as to further increase transmission capacity of the optical transmission system. Specifically, the DP-QPSK modulation or the DP-QAM modulation is performed with respect to a plurality of light beams having wavelengths different from each other, and the plurality of modulated light beams having wavelengths different from each other are collected as one light beam by using a wavelength combiner. The resultant light beam is transmitted by one optical fiber. In an optical transmission device in which a plurality of light beams are respectively modulated and are transmitted by one optical fiber, from the viewpoint of miniaturization of the device and the like, there is a demand for an integration-type optical modulation device that includes a plurality of optical modulation elements (or an integration-type optical modulation element in which a plurality of optical modulation elements are formed on one LN substrate) in one housing to respectively modulate the plurality of input light beams and output the plurality of modulated light beams.

In this case, in general, it is necessary to extend a distance between two linearly polarized light beams output from one optical modulation element and two linearly polarized light beams output from another optical modulation element from the necessity for securing a space for optical components such as a polarization beam combiner that combines light beams (linearly polarized light beams) output two by two from each of the plurality of optical modulation elements, and a lens that couples light beams output from the polarization beam combiner to an optical fiber.

As the integration-type optical modulation device, in the related art, there is known the following integration-type optical modulation device including two optical modulation elements. After a distance between two linearly polarized light beams output from one optical modulation element and two linearly polarized light beams output from the other optical modulation element is extended by using two optical path shift prisms (that is, prisms for parallel movement of an optical path), the two linearly polarized light beams output from each of the optical modulation element are combined into one light beam by a polarization beam combining prism and the like, and the resultant light beam is output to the outside of a housing by one optical fiber (Patent Literature No. 1).

In the optical modulation device, distances from the two optical modulation elements to the two optical path shift prisms are made to be different from each other. According to this, damage of an optical component, which occurs when the two optical path shift prisms come into contact with each other and the like, is prevented.

However, in a case of constituting the optical modulation device, it is required to significantly reduce the number of optical components which are inserted into an optical path as possible from the viewpoint of an improvement in optical coupling efficiency between the optical modulation element and an output optical fiber, from the viewpoint of stabilization of a temperature variation or a variation with the passage of time in the optical coupling efficiency, and from the viewpoint of a reduction in a device size or a device cost.

That is, in the integration-type optical modulation device of the related art, there is a room for improvements from the viewpoints of an improvement and stabilization of optical characteristics, miniaturization, low cost, and the like.

CITATION LIST

Patent Literature

[Patent Literature No. 1] Japanese Laid-open Patent Publication No. 2015-172630

SUMMARY OF INVENTION

Technical Problem

From the background, in an integration-type optical modulation device that includes a plurality of optical modulation elements which are respectively formed on separate substrates or are arranged on one substrate, combines two modulated and linearly polarized light beams output from each of the plurality of optical modulation elements into one light beam, and outputs the resultant light beam from one optical fiber, it is required to realize a configuration capable of realizing a further improvement from the viewpoints of an improvement and stabilization of optical characteristics, miniaturization, low cost, and the like.

Solution to Problem

According to an aspect of the invention, there is provided an optical modulation device including: a first optical modulation element and a second optical modulation element each of which outputs two output light beams; a first optical path shift element that shifts optical paths of the two output light beams from the first optical modulation element by a same distance to a first direction; a second optical path shift element that shifts optical paths of the two output light beams from the second optical modulation element by a same distance to a second direction opposite to the first direction; a first polarization beam combining element that combines the two output light beams after passing through the first optical path shift element into one beam and outputs the combined beam; and a second polarization beam combining element that combines the two output light beams after passing through the second optical path shift element into one beam and outputs the combined beam, in which the first optical modulation element and the second optical modulation element are disposed to output the output light beams side by side, and the first optical path shift element and the second optical path shift element are integrally formed as one optical component.

According to the aspect of the invention, each of the first and second polarization beam combining elements includes a half-wavelength plate and a polarization beam combining prism, and the half-wavelength plate and the polarization beam combining prism constituting in the first polarization beam combining element are respectively disposed at a line-symmetrical position with respect to the half-wavelength plate and the polarization beam combining prism comprised in the second polarization beam combining element based on a line segment parallel to propagation directions of the output light beams output side by side.

According to the aspect of the invention, the optical modulation device further includes: a rectangular housing that accommodates the first and second polarization beam combining elements, in which the line segment parallel to the propagation direction of the output light beam coincides with one center-line of the housing, the housing has a first hole which guides the beams output from the first polarization beam combining element to an outside of the housing, and a second hole which guides the beams output from the second polarization beam combining element to the outside of the housing, and the first and second holes are disposed at symmetrical positions from each other with respect to the one center-line.

According to the aspect of the invention, the first and second optical modulation elements are respectively formed on separate substrates or are formed on an identical substrate side by side.

According to the aspect of the invention, the first and second optical modulation elements are formed on an identical substrate side by side, and the line segment parallel to the propagation direction of the output light beam coincides with one center-line of the substrate.

According to the aspect of the invention, the first and second optical modulation elements are respectively formed on two separate substrates, the two substrates are disposed with a gap by a predetermined distance from each other, and the line segment parallel to the propagation direction of the output light beam coincides with a center-line of the gap.

According to the aspect of the invention, the first and second optical modulation elements are optical modulation elements which perform phase shift keying or quadrature amplitude modulation.

According to the aspect of the invention, the optical modulation device further includes: four output lenses that respectively receive the four output light beams output from the first and second optical modulation elements, in which the four output lenses are an integration-type microlens array.

DESCRIPTION OF EMBODIMENTS

Hereinafter, embodiments of the present invention will be described with reference to drawings.

Figure 1:
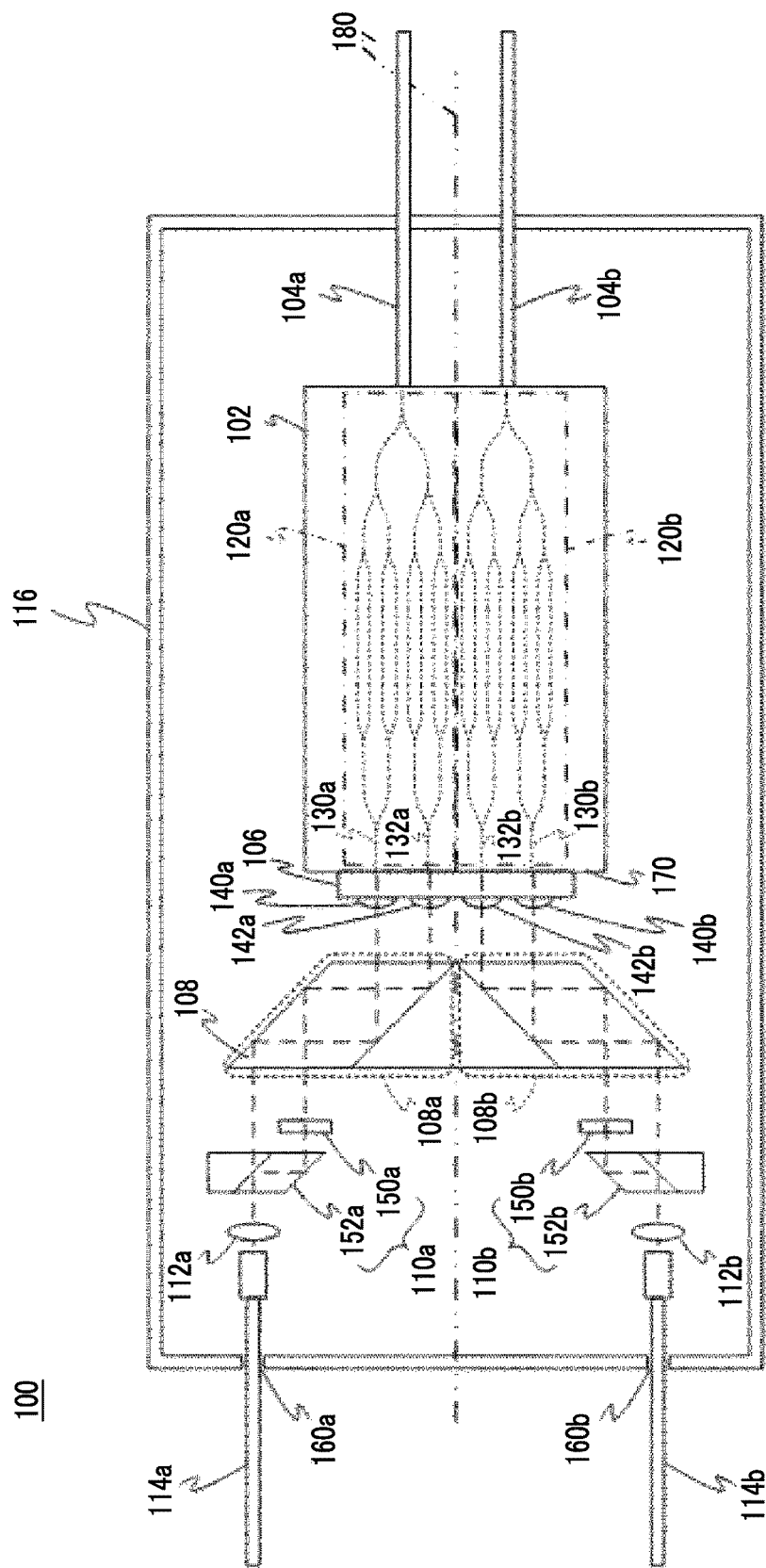
FIG. 1 is a view illustrating a configuration of an optical modulation device according to an embodiment of the present invention.

FIG. 1 is a view illustrating a configuration of an optical modulation device according to the embodiment of the present invention. An optical modulation device 100 includes an optical modulator 102, input optical fibers 104a and 104b which are optical fibers through which a light beam from a light source (not illustrated) is input to the optical modulator 102, an output microlens array 106, an optical path shift prism 108, polarization beam combiners 110a and 110b, coupling lenses 112a and 112b, output optical fibers 114a and 114b, and a housing 116.

For example, the input optical fibers 104a and 104b allow linearly polarized light beams, which are transmitted from two light sources (not illustrated) and have wavelengths different from each other, to be input to the optical modulator 102.

The optical modulator 102 includes two optical modulation elements 120a and 120b which are formed on one sheet of LN substrate and include optical waveguides. For example, the optical modulation elements 120a and 120b are optical modulation elements which perform DP-QPSK modulation or DP-QAM modulation.

As illustrated in FIG. 1, the optical modulation elements 120a and 120b are disposed so that the output light beams are output side by side. That is, in FIG. 1, the optical modulation elements 120*a* and 120*b* are disposed so that all of the output light beams of the optical modulation elements 120*a* and 120*b* are output from a substrate end surface 170 on the left side in the drawing of the optical modulator 102 in the left direction side by side in the vertical direction in the drawing. In addition, the present embodiment, the optical modulation elements 120*a* and 120*b* are disposed at positions which are line-symmetrical with respect to a line segment 180 parallel to the propagation directions of the output light beams output side by side.

In the present embodiment, the optical modulation elements 120*a* and 120*b* are disposed so that all of the output light beams output from the optical modulation elements 120*a* and 120*b* are output side by side in a linear shape in the vertical direction in FIG. 1, but the present embodiment is not limited thereto. As long as all of the output light beams of the optical modulation elements 120*a* and 120*b* are output "side by side", the output light beams of the optical modulation elements 120*a* and 120*b* may be disposed so that the output light beams have predetermined positional relationship with each other. For example, the optical modulation elements 120*a* and 120*b* also may be disposed so that output end surfaces (left side end surfaces illustrated in FIG. 1) of the respective light beams of the optical modulation elements 120*a* and 120*b* are disposed to be displaced from each other by a predetermined distance in the left-right direction in FIG. 1. In addition, for example, the output light beams of the optical modulation elements 120*a* and 120*b* may be disposed so that output points of the respective light beams from the optical modulation elements 120*a* and 120*b* are different from each other in the substrate thickness direction (direction perpendicular to the page of FIG. 1) of the optical modulation elements 120*a* and 120*b*.

The optical modulation element 120*a* is a first optical modulation element. The linearly polarized light beam input from the input optical fiber 104*a* is branched into two light beams and modulated by signals different from each other, and respectively output from output waveguides 130*a* and 132*a*. In addition, the optical modulation element 120*b* is a second optical modulation element. The linearly polarized light beam input from the input optical fiber 104*b* is branched into two light beams and modulated by electronic signals different from each other, and respectively output from output waveguides 130*b* and 132*b*.

The output microlens array 106 formed by four microlenses 140*a*, 142*a*, 140*b*, and 142*b*, which are four output lenses, is disposed on the substrate end surface 170 (substrate end surface on a side (that is, left side in the drawing) on which output waveguides 130*a*, 132*a*, 130*b*, and 132*b* are formed) on a light beam output side of the optical modulator 102.

Figure 2:
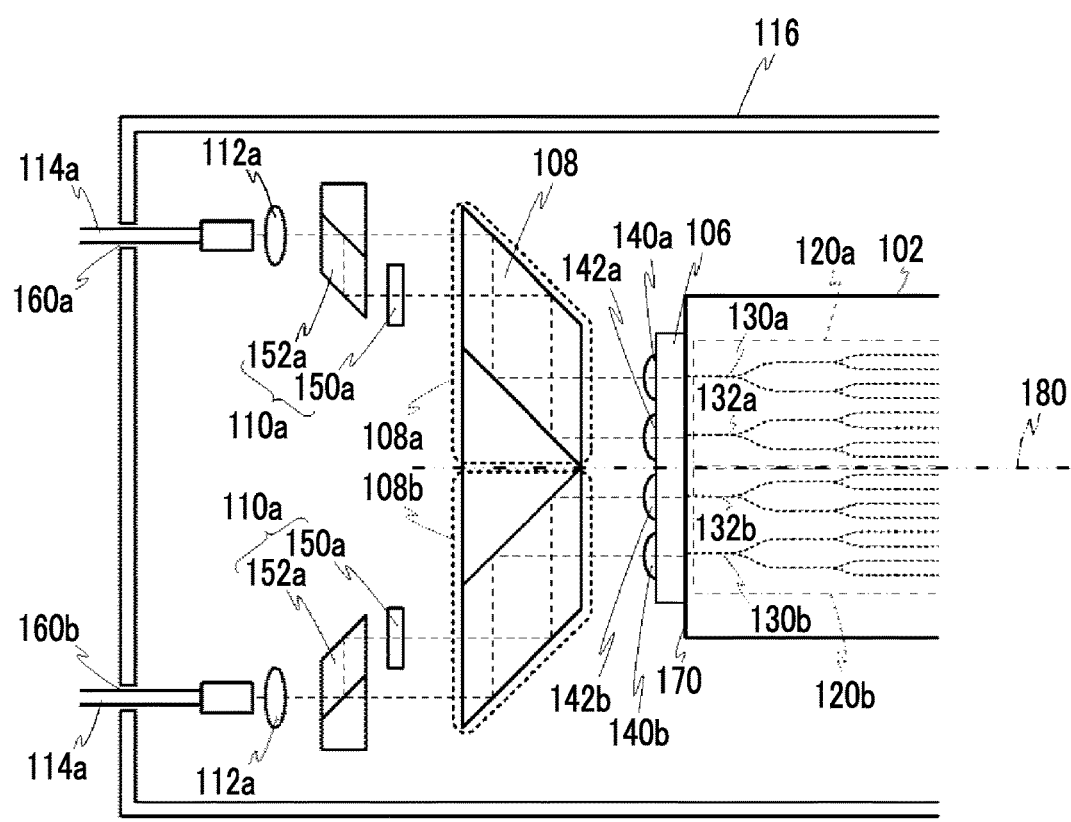
FIG. 2 is a partial detail view of the periphery of a microlens array in the optical modulation device illustrated in FIG. 1.

FIG. 2 is a partial detail view of the periphery of the output microlens array 106 in the optical modulation device 100 illustrated in FIG. 1.

The light beams output from the output waveguides 130*a* and 132*a* of the optical modulation element 120*a* are input to the microlenses 140*a* and 142*a* and the light beams output from the output waveguides 130*b* and 132*b* of the optical modulation element 120*b* are input to the microlenses 140*b* and 142*b*. The light beams input to the microlenses 140*a*, 142*a*, 140*b*, and 142*b* respectively become, for example, the parallel light beam by being collimated (collimated light beam) and the resultant light beams are output.

The optical path shift prism 108 is formed by integrating two optical path shift prisms and includes an optical path shift prism unit 108*a* and an optical path shift prism unit 108*b*. The optical path shift prism unit 108*a* is a first optical path shift element and shifts light beam axes of the output light beams output from the output waveguides 130*a* and 132*a* of the optical modulation element 120*a* while maintaining the light beam axis direction. In addition, the optical path shift prism unit 108*b* is a second optical path shift element and shifts light beam axes of the output light beams output from the output waveguides 130*b* and 132*b* of the optical modulation element 120*b* while maintaining the light beam axis direction. Further, the shift directions of the light beam axes in the first optical path shift element and the second optical path shift element are away from each other (that is, are shifted in opposite directions).

Here, for example, the optical path shift prism 108 is disposed so that the optical path shift prism units 108*a* and 108*b* are line-symmetrical with respect to the line segment 180.

The respective two light beams output from the optical path shift prism units 108*a* and 108*b* are respectively input to the polarization beam combiner 110*a*, which is the first polarization beam combining element, and the polarization beam combiner 110*b*, which is the second polarization beam combining element. The polarization beam combiners 110*a* and 110*b* respectively include, for example, half-wavelength plates 150*a* and 150*b*, and polarization beam combining prisms 152*a* and 152*b*.

The polarization beam combiner 110*a* combines the two linearly polarized light beams output from the output waveguides 130*a* and 132*a* of the optical modulation element 120*a* and passed through the optical path shift prism unit 108*a*, and outputs as one light beam. In the same manner, the polarization beam combiner 110*b* combines the two linearly polarized light beams output from the output waveguides 130*b* and 132*b* of the optical modulation element 120*b* and passed through the optical path shift prism unit 108*b*, and outputs as one light beam.

The beams output from the polarization beam combiner 110*a* are collected by the coupling lens 112*a*, coupled to the output optical fiber 114*a*, and guided to the outside of the housing 116. In addition, the beams output from the polarization beam combiner 110*b* are collected by the coupling lens 112*b*, coupled to the output optical fiber 114*b*, and guided to the outside of the housing 116.

The half-wavelength plates 150*a* and 150*b* and the polarization beam combining prisms 152*a* and 152*b* respectively included in the polarization beam combiners 110*a* and 110*b* are disposed to be line-symmetrical with respect to the line segment 180, for example. In addition, the coupling lenses 112*a* and 112*b* and the output optical fibers 114*a* and 114*b* respectively included in the polarization beam combiners 110*a* and 110*b* are disposed to be line-symmetrical with respect to the line segment 180, for example.

The housing 116 has, for example, a rectangular shape, is made of, for example, a metal (aluminum, stainless steel, or the like), and accommodates parts of the optical modulator 102, the output microlens array 106, the optical path shift prism 108, the polarization beam combiners 110*a* and 110*b*, the coupling lenses 112*a* and 112*b*, and the input optical fibers 104*a* and 104*b* and parts of the output optical fibers 114*a* and 114*b*. In addition, one center-line (in the present embodiment, a line extending in the left-right direction in FIG. 1 and passing through a center of a length of the housing 116 in the vertical direction in the drawing) of the housing 116 is equal to the line segment 180.

Further, in the housing 116, a hole 160*a* which is a first hole (through which the output optical fiber 114*a* is inserted in the present embodiment) for guiding the beams output from the polarization beam combiner 110*a* to the outside of the housing 116 and a hole 160b which is a second hole (through which the output optical fiber 114b is inserted in the present embodiment) for guiding the beams output from the polarization beam combiner 110b to the outside of the housing 116 are provided at positions which are symmetrical from each other with respect to the center-line equal to the line segment 180.

According to this configuration, the light beams input from the input optical fiber 104a become the linearly polarized light beams respectively and independently modulated and polarized in the orthogonal directions from each other and are output from the optical modulation element 120a. After passing through the optical path shift prism unit 108a of the optical path shift prism 108, the linearly polarized light beams are polarization-beam-combined by the polarization beam combiner 110a and output from the output optical fiber 114a. In addition, the light beams input from the input optical fiber 104b become the linearly polarized light beams respectively and independently modulated and polarized in the orthogonal directions from each other and are output from the optical modulation element 120b. After passing through the optical path shift prism unit 108b of the optical path shift prism 108, the linearly polarized light beams are polarization-beam-combined by the polarization beam combiner 110b and output from the output optical fiber 114b.

Specifically, in the optical modulation device 100, the optical path shift prism units 108a and 108b which are first and second optical path shift elements are integrally formed as the optical path shift prism 108 (that is, as one optical component). For this reason, it is possible to reduce an optical loss by reducing the number of used optical elements and to seek stabilization (variation with environmental temperature or the like) of optical characteristics such as the optical loss, and it is possible to miniaturize the housing 116 and to reduce a material cost, an assembly cost, or the like.

In addition, in the optical modulation device 100 of the present embodiment, the optical modulation elements 120a and 120b, the optical path shift prism 108, the polarization beam combiners 110a and 110b, the coupling lenses 112a and 112b, and the output optical fibers 114a and 114b are respectively disposed to be line-symmetrical with respect to the line segment 180 parallel to the propagation directions of the output light beams of the optical modulation elements 120a and 120b.

Generally, in a rectangular housing such as the housing 116 illustrated in FIG. 1, a distortion occurring at environmental temperature variation has geometrically approximate symmetry. For this reason, since the optical system, after the beams are input from the input optical fibers 104a and 104b until the beams are output to the output optical fibers 114a and 114b, is symmetrical with respect to the line segment 180, it is possible to make comparable degrees of positional deviation amount of the optical element in each of the optical systems at the environmental temperature variation.

As a result, for example, in a case where two light beams included in two wavelength channels of a wavelength multiplex transmission system are modulated by the optical modulation device 100, it is possible to make changes, according to the environmental temperature variation, of an optical loss from the input optical fiber 104a to the output optical fiber 114a and an optical loss (transmission loss or insertion loss, the same below) from the input optical fiber 104b to the output optical fiber 114b be comparable degrees. Accordingly, it is possible to prevent a loss difference between the wavelength channels according to the environmental temperature variation from occurring or increasing (accordingly, to prevent a level difference of the transmission light beams between the wavelength channels in the wavelength multiplex system from occurring or increasing) and to prevent a disparity of a transmission quality between the channels from occurring or increasing.

In addition, as described above, the two optical systems until the light beam input from the input optical fibers 104a and 104b are respectively output to the output optical fibers 114a and 114b, are disposed to be symmetrical with respect to the line segment 180 from each other. For this reason, since the line segment 180 is equal to the center-line (for example, in the present embodiment, a center line extending in the left-right direction in FIG. 1 and passing through the center of the length of the housing 116 in the vertical direction in the drawing) of the housing 116, it is possible to provide the holes 160a and 160b for guiding the output optical fibers 114a and 114b to the outside of the housing 116, to be symmetrical with respect to the center-line of the housing 116. As a result, for example, since it is possible to make distortions of the housing 116 occurring in the vicinity of the holes 160a and 160b when a cover is hermetically sealed with the housing 116 by being pressed and melted be approximately symmetrical with respect to the center-line from each other, it is possible to equalize optical path deviations (light beam axis deviations) occurring due to the distortions in the two optical systems and a refractive index change of the optical component such as the substrate. Accordingly, even in a case where the distortion occurs in the housing 116 in a manufacturing process such as the pressing and sealing, it is possible to reduce occurrence of a difference between the optical characteristics such as an optical loss in the two optical systems.

In the present embodiment, the coupling lenses 112a and 112b are accommodated in the housing 116, but the embodiment is not limited thereto. The holes 160a and 160b may be respectively provided with transparent glasses to form two windows and the two beams from the polarization beam combiners 110a and 110b may be respectively output by passing through the two windows. In this case, the beams respectively output from the two windows can be respectively coupled to the output optical fibers 114a and 114b disposed outside of the housing 116 by the coupling lenses 112a and 112b disposed outside of the housing 116. At this time, the coupling lens 112a and the output optical fiber 114a, and the coupling lens 112b and the output optical fiber 114b may be fixed at a position, at which the beams output from the two windows can be received, on an outer surface of the housing 116.

In addition, in the embodiment described above, the line segment 180 is set to the center-line of the housing 116, but the embodiment is not limited thereto. In a case where the optical modulation element 120a and the optical modulation element 120b are formed on one substrate, the line segment 180 may be equal to a center-line (more specifically, for example, a center-line parallel to the propagation directions of the light beams output from the optical modulation elements 120a and 120b) of the substrate. In addition, in a case where the optical modulation element 120a and the optical modulation element 120b are respectively formed on two separate substrates, the line segment 180 may be equal to a center-line between the two substrates (for example, the two substrates (for example, respective ones of sides) are disposed to be opposed to each other with a gap by a predetermined distance, and a center line of the gap between respective ones of the sides respectively disposed parallel to each other and the line segment 180 may be equal to each other).

Generally, in the housing of the optical modulation device, since an area occupied by the substrate of the optical modulator can be dominant (or the substrate can be the maximum among the optical components accommodated in the housing), the center-line of the substrate or the center-line between the substrates does not greatly deviate from the center-line of the housing. For this reason, according to this configuration, it is possible to make the distortions of the housing 116 occurring due to the environmental temperature variation be approximately symmetrical with respect to the center-line from each other. As a result, it is possible to equalize optical path deviations (light beam axis deviations) occurring due to the distortions in the optical modulation element 120a and the optical modulation element 120b or the refractive index change (refractive index change caused by a stress obtained by occurring due to the distortion) of the optical component such as the substrate. Accordingly, even in a case where the distortion occurs in the housing 116 in the manufacturing process such as the pressing and sealing or even in a case where the environmental temperature variation occurs, it is possible to reduce occurrence of a difference between the optical characteristics such as an optical loss in the optical modulation element 120a and the optical modulation element 120b.

In addition, the half-wavelength plate 150a and the polarization beam combining prism 152a included in the polarization beam combiner 110a may be disposed to be respectively line-symmetrical with the half-wavelength plate 150b and the polarization beam combining prism 152b included in the polarization beam combiner 110b based on the line segment 180, which is equal to the center-line of the substrate or the center-line between the substrates as described above so as to further increase the effects described above.

Further, the optical path shift prism 108a also may be disposed to be line-symmetrical with the optical path shift prism 108b based on the line segment 180, which is equal to the center-line of the substrate or the center-line between the substrates as described above (for example, in a case where the center-line of the substrate or the center-line between the substrates does not greatly deviate from the center-line of the housing) so as to further increase the effects described above. In addition, alternately, the first hole for guiding the beams output from the polarization beam combiner 110a to the outside of the housing also may be disposed to be line-symmetrical with the second hole for guiding the beams output from the polarization beam combiner 110b to the outside of the housing based on the line segment 180, which is equal to the center-line of the substrate or the center-line between the substrates as described above (for example, in the case where the center-line of the substrate or the center-line between the substrates does not greatly deviate from the center-line of the housing) so as to further increase the effects described above.

REFERENCE SIGNS LIST

100: optical modulation device
102: optical modulator
104a, 104b: input optical fiber
106: output microlens array
108: optical path shift prism
110a, 110b: polarization beam combiner
112a, 112b: coupling lens
114a, 114b: output optical fiber
116: housing
120a, 120b: optical modulation element
130a, 132a, 130b, 132b: output waveguide
140a, 142a, 140b, 142b: microlens
150a, 150b: half-wavelength plate
152a, 152b: polarization beam combining prism
160a, 160b: hole
170: substrate end surface

The invention claimed is:

1. An optical modulation device comprising:
 a first optical modulation element and a second optical modulation element each of which outputs two output light beams;
 a first optical path shift element that shifts optical paths of the two output light beams from the first optical modulation element by a same distance to a first direction;
 a second optical path shift element that shifts optical paths of the two output light beams from the second optical modulation element by a same distance to a second direction opposite to the first direction;
 a first polarization beam combining element that combines the two output light beams after passing through the first optical path shift element into one beam and outputs the combined beam; and
 a second polarization beam combining element that combines the two output light beams after passing through the second optical path shift element into one beam and outputs the combined beam,
 wherein the first optical modulation element and the second optical modulation element are disposed to output the output light beams side by side, and
 the first optical path shift element and the second optical path shift element are integrally formed as one unitary optical path shift component.

2. The optical modulation device according to claim 1,
 wherein each of the first and second polarization beam combining elements comprises a half-wavelength plate and a polarization beam combining prism, and
 the half-wavelength plate and the polarization beam combining prism comprised in the first polarization beam combining element are respectively disposed at a line-symmetrical position with respect to the half-wavelength plate and the polarization beam combining prism constituting the second polarization beam combining element based on a line segment parallel to propagation directions of the output light beams output side by side.

3. The optical modulation device according to claim 2, further comprising:
 a rectangular housing that accommodates the first and second polarization beam combining elements,
 wherein the line segment parallel to the propagation direction of the output light beam coincides with one center-line of the housing, the housing including:
  a first hole which guides the beams output from the first polarization beam combining element to an outside of the housing, and
  a second hole which guides the beams output from the second polarization beam combining element to the outside of the housing, and
 the first and second holes are disposed at symmetrical positions from each other with respect to the one center-line.

4. The optical modulation device according to claim 1, wherein the first and second optical modulation elements are respectively formed on separate substrates or are formed on an identical substrate side by side.

5. The optical modulation device according to claim 2, wherein the first and second optical modulation elements are formed on an identical substrate side by side, and the line segment parallel to the propagation direction of the output light beam coincides with one center-line of the substrate.

6. The optical modulation device according to claim 2, wherein the first and second optical modulation elements are respectively formed on two separate substrates,
the two substrates are disposed with a gap by a predetermined distance from each other, and
the line segment parallel to the propagation direction of the output light beam coincides with a center-line of the gap.

7. The optical modulation device according to claim 1, wherein the first and second optical modulation elements are optical modulation elements which perform phase shift keying or quadrature amplitude modulation.

8. The optical modulation device according to claim 1, further comprising:
four output lenses that respectively receive the four output light beams output from the first and second optical modulation elements,
wherein the four output lenses are an integration-type microlens array.

9. An optical modulation device comprising:
a first optical modulation element and a second optical modulation element each of which outputs two output light beams;
a first optical path shift element that shifts optical paths of the two output light beams from the first optical modulation element by a same distance to a first direction;
a second optical path shift element that shifts optical paths of the two output light beams from the second optical modulation element by a same distance to a second direction opposite to the first direction;
a first polarization beam combining element that combines the two output light beams after passing through the first optical path shift element into one beam and outputs the combined beam; and
a second polarization beam combining element that combines the two output light beams after passing through the second optical path shift element into one beam and outputs the combined beam,
wherein the first optical modulation element and the second optical modulation element are disposed to output the output light beams side by side,
the first optical path shift element and the second optical path shift element are integrally formed as one optical path shift component; and
the first optical path shift element and the second optical path shift element have shapes that are symmetrical to each other about a line extending between the first optical path shift element and the second optical path shift element.

10. The optical modulation device according to claim 9, the first polarization beam combining element and the second polarization beam combining element are symmetrical to each other about a line extending between the first polarization beam combining element and the second polarization beam combining element and are disposed in line symmetry with respect to a line segment parallel to a propagation direction of the output beams output side by side.

* * * * *